Dec. 7, 1937.  W. H. N. STEVENS  2,101,414
COMBINED CANTEEN, COOKING, AND MESS KIT
Filed March 29, 1937  2 Sheets—Sheet 1
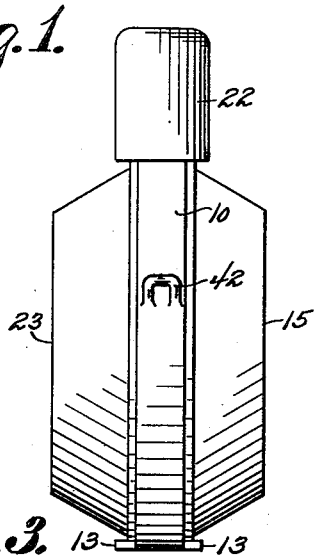
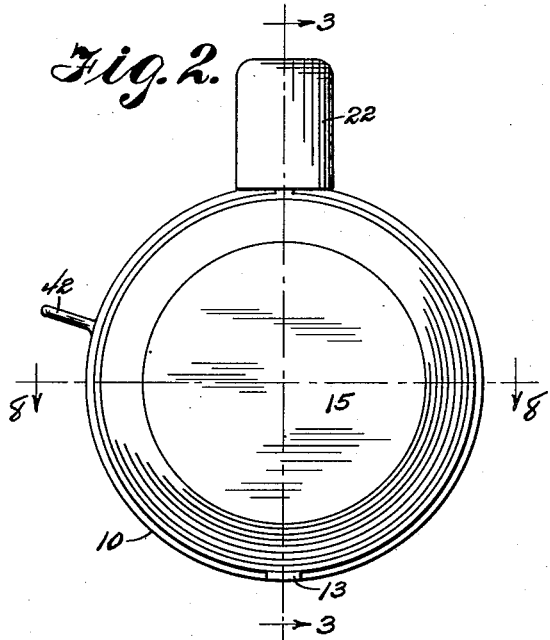
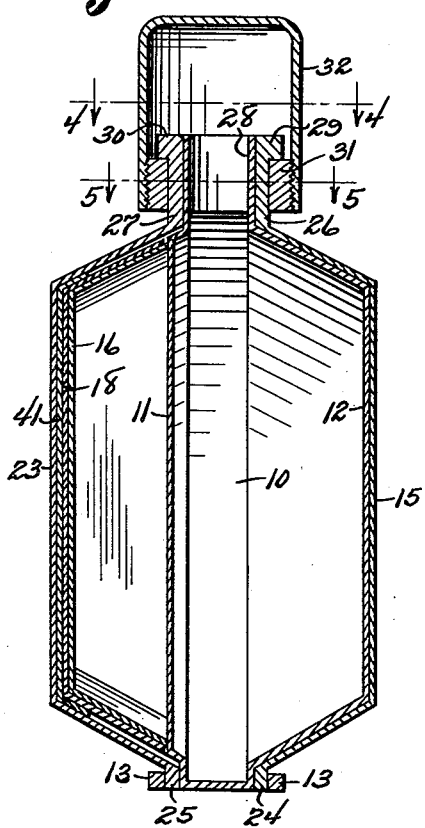
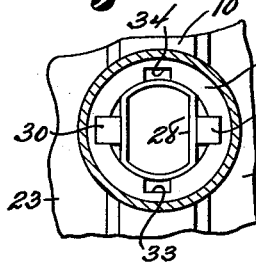
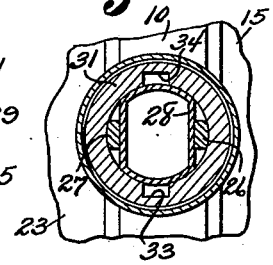
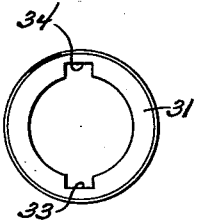
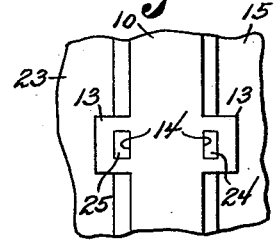
William H. N. Stevens
INVENTOR
BY Victor J. Evans & Co.
ATTORNEYS Dec. 7, 1937.  W. H. N. STEVENS  2,101,414
COMBINED CANTEEN, COOKING, AND MESS KIT
Filed March 29, 1937  2 Sheets-Sheet 2
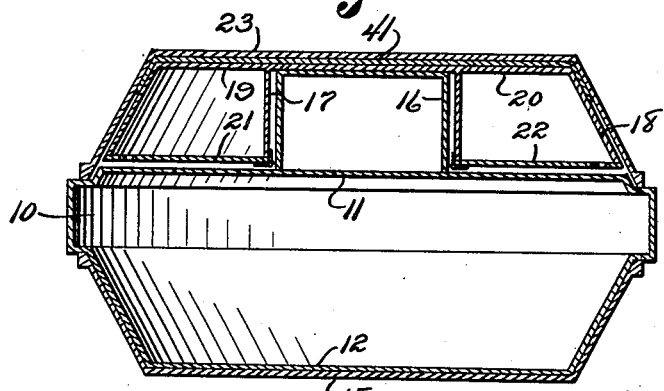
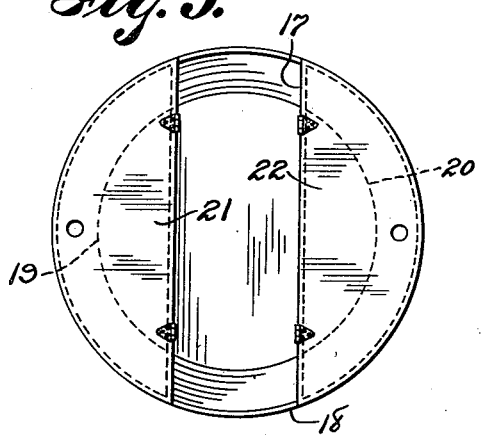
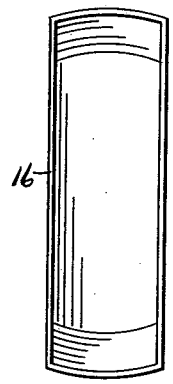
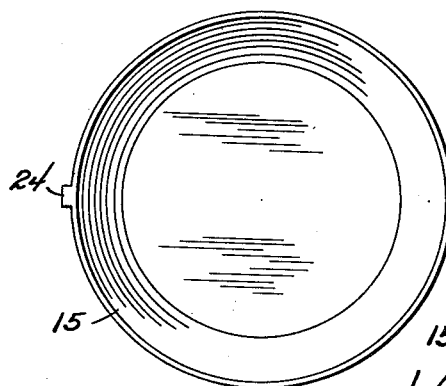
William H. N. Stevens INVENTOR
BY Victor J. Evans & Co.
ATTORNEYS Patented Dec. 7, 1937

2,101,414

UNITED STATES PATENT OFFICE 2,101,414

COMBINED CANTEEN, COOKING, AND MESS KIT

William H. N. Stevens, Columbus, Ohio

Application March 29, 1937, Serial No. 133,718

5 Claims. (Cl. 206—4)

This invention relates to a combined canteen, cooking and mess kit and has for an object to provide a compact assembly of utensils which will be free from the usual objectionable projections, which may be readily assembled and disassembled, which may be easily maintained in a sanitary condition, and which even though a slight dent is formed in any of the utensils they may still be readily assembled and disassembled.

A further object is to provide a device of this character in which the utensils will be so assembled as to eliminate rattling, and which will be formed of a few strong simple and durable parts, essential to the comfort of the hunter, trapper, military person and others, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a side elevation of a combined canteen, cooking and mess kit, constructed in accordance with the invention.

Figure 2 is a front elevation of the device shown in Figure 1.

Figure 3 is an enlarged longitudinal sectional view of the device taken on the line 3—3 of Figure 2.

Figure 4 is a detail cross sectional view taken on the line 4—4 of Figure 3 and showing the manner of securing the parts together at the neck of the canteen.

Figure 5 is a detail cross sectional view taken on the line 5—5 of Figure 4 and showing in section the parts which are shown in plan in Figure 4.

Figure 6 is a plan view of the assembling ring.

Figure 7 is a fragmentary bottom plan view showing the manner of securing the parts in assembled relationship at the bottom of the canteen.

Figure 8 is an enlarged cross sectional view taken on the line 8—8 of Figure 2.

Figure 9 is a plan view of the cooking pan with covered compartments.

Figure 10 is a plan view of a pan which is nested in the compartment pan.

Figure 11 is a plan view of the frying pan with a long jointed handle assembled therewith.

Figure 12 is a detail sectional view showing the coupling pin connecting the handle to the frying pan.

Referring now to the drawings in which like characters of reference designate similar parts in the various views, 10 designates a canteen having a shallow side 11 and a deep side 12, best shown in Figure 3, the deep side being of frusto-conical formation. The canteen is provided at its bottom with laterally directed ears 13 having substantially rectangular perforations 14 therein, as best shown in Figure 7.

A frying pan 15 is arranged on the deep side of the canteen. A pan 16 of the general shape shown in Figure 10 is nested in a center compartment 17 of a kit section 18 which is provided with a compartment 19 for first aid needs, and a compartment 20 for traveler's accessories, both compartments being closed by respective hinge doors 21 and 22, as best shown in Figure 9. The nested pan and kit section are arranged on the shallow side of the canteen as best shown in Figure 3.

A cooking pan 23 is arranged on the nested pan and kit section as also best shown in Figure 3. The frying pan 15 and the cooking pan 23 are provided at the bottom with respective lugs 24 and 25 which fit in the apertures of the ears 13 on the canteen, as best shown in Figures 3 and 7.

The frying pan and the cooking pan are provided at the top with respective extensions or necks 26 and 27 which are arranged on opposite sides of the neck 28 of the canteen and which are provided at their upper ends with respective laterally directed lugs 29 and 30 as best shown in Figures 3, 4 and 5. A ring 31 embraces the neck 28 of the canteen and the extensions or necks 26 and 27 of the frying pan and of the cooking pan, and is held in place by the lugs 29 and 30 of said extensions or necks 26 and 27. The ring is externally screw threaded and threadedly engages the mouth of a cup 32.

The ring also is provided with grooves 33 and 34, best shown in Figures 4, 5 and 6 through which the lugs 29 and 30 are passed when assembling the parts and then the ring may be given a half turn to dispose the lugs in overlapping relationship with the ring as best shown in Figure 4 to hold the parts assembled.

Initially the lugs 24 and 25 at the bottom of the frying pan 12 and the cooking pan 23 are slipped into the perforations 14 of the ears 13 on the bottom of the canteen before the assembling ring 31 is applied to assemble the parts as just described. To take down the device it is simply necessary to remove the cup 32 and rotate the ring a one-quarter turn whereupon it may be slipped off of the lugs 29 and 30 and extensions or necks 26 and 27 of the frying pan and of the cooking pan respectively whereupon the lugs 24 and 25 of these pans may be detached from the ears 13 of the canteen.

A jointed long handle 35, best shown in Figure 11, is provided with a socket member 36, best shown in Figure 12, to receive the extension or neck 26 and the lug 29 of the frying pan. A pin 37 is passed through registering openings 38 and 39 formed in the lug and in the socket member to secure the handle to the frying pan. A chain 40 attaches the pin permanently to one section of the handle so that it may not become lost.

A plate 41, as best shown in Figure 3, is nested in the cooking pan 23. A handle 42, best shown in Figures 1 and 2, is secured to one side of the canteen and forms an attaching means for securing the device to the person of the wearer.

From the above description it is thought that the construction and operation of the invention will be fully understood without further explanation.

What is claimed is:

1. A combined canteen, cooking and mess kit, comprising a canteen having a neck, laterally extending apertured projections on the bottom of the canteen, a frying pan arranged on one side of the canteen, a cooking pan arranged on the other side of the canteen, lugs on the bottom of both pans engageable in said apertured projections, extensions on the top of both pans adapted to lie along said neck of the canteen, and a coupling ring adapted to embrace said neck and the last named extensions for holding the parts assembled.

2. A combined canteen, cooking and mess kit, comprising a canteen having a neck, laterally extending apertured projections on the bottom of the canteen, a frying pan arranged on one side of the canteen, a cooking pan arranged on the other side of the canteen, lugs on the bottom of both pans engageable in said apertured projections, extensions on the top of both pans adapted to lie along said neck of the canteen, said extensions on the top of both pans terminating in outwardly directed lugs, a coupling ring having notches to permit said lugs passing through the ring, said ring being adapted to encircle said extensions and the neck of the canteen to hold the parts assembled, and a cup detachably engaged with said ring.

3. A combined canteen, cooking and mess kit, comprising a canteen having a shallow side and a deep side of which the latter is of frusto-conical formation, laterally directed apertured projections on the bottom of the canteen, a frying pan arranged on the deep side of the canteen, a nested pan, kit section, plate and cooking pan arranged on the shallow side of the canteen, lugs on the bottom of the frying pan and of the cooking pan adapted to fit in said apertured extensions on the canteen, a cup detachably connected with the canteen, and means for securing the top of the frying pan and of the cooking pan to the canteen adjacent to said cup.

4. A combined canteen, cooking and mess kit, comprising a canteen having a shallow side and a deep side of which the latter is frusto-conical formation, laterally directed apertured projections on the bottom of the canteen, a frying pan arranged on the deep side of the canteen, a nested pan, kit section, plate and cooking pan arranged on the shallow side of the canteen, lugs on the bottom of the frying pan and of the cooking pan adapted to fit in said apertured extensions on the canteen, the frying pan and the cooking pan being provided with upstanding lugs at the top, a coupling ring adapted to encircle said lugs and embrace the neck portion of the canteen to hold the parts assembled, and a cup screw threadedly engaged with the coupling ring.

5. A combined canteen, cooking and mess kit, comprising a canteen having a shallow side and a deep side of which the latter is frusto-conical formation, laterally directed apertured projections on the bottom of the canteen, a frying pan arranged on the deep side of the canteen, a nested pan, kit section, plate and cooking pan arranged on the shallow side of the canteen, lugs on the bottom of the frying pan and of the cooking pan adapted to fit in said apertured extensions on the canteen, extensions formed on the frying pan and on the cooking pan, a neck for the canteen against which said extensions are adapted to be disposed, outstanding lugs on the extensions, a coupling ring adapted to encircle said extensions and said neck of the canteen, the coupling ring having notches adapted to permit said lugs to pass through the ring and overlap the ring when the ring is given a quarter turn to hold the parts assembled, and a cup screw threadedly engaged with the ring.

WILLIAM H. N. STEVENS.